United States Patent
Flens

(10) Patent No.: US 9,485,018 B2
(45) Date of Patent: Nov. 1, 2016

(54) OPTICAL SOURCE MONITORING SYSTEM

(71) Applicant: FINISAR CORPORATION, Sunnyvale, CA (US)

(72) Inventor: Frank Flens, Campbell, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 38 days.

(21) Appl. No.: 14/210,098

(22) Filed: Mar. 13, 2014

(65) Prior Publication Data

US 2014/0270750 A1    Sep. 18, 2014

Related U.S. Application Data

(60) Provisional application No. 61/780,721, filed on Mar. 13, 2013.

(51) Int. Cl.
| | | |
|---|---|---|
| *H04B 10/04* | (2006.01) | |
| *H04B 10/079* | (2013.01) | |
| *H04B 10/572* | (2013.01) | |
| *H04J 14/02* | (2006.01) | |

(52) U.S. Cl.
CPC .... *H04B 10/07951* (2013.01); *H04B 10/0799* (2013.01); *H04B 10/572* (2013.01); *H04J 14/02* (2013.01)

(58) Field of Classification Search
None
See application file for complete search history.

(56) References Cited

U.S. PATENT DOCUMENTS

| | | | | |
|---|---|---|---|---|
| 5,845,023 | A * | 12/1998 | Lee | G02B 6/2848 385/33 |
| 7,099,536 | B1 * | 8/2006 | Chandra | 385/33 |
| 2004/0052463 | A1 | 3/2004 | Chen | |
| 2010/0295063 | A1 * | 11/2010 | Morioka | 257/80 |
| 2012/0173175 | A1 * | 7/2012 | Devicharan et al. | 702/60 |

OTHER PUBLICATIONS

International Search Report and Written Opinion mailed Jul. 22, 2014 in related PCT Application No. PCT/US2014/026666.

* cited by examiner

*Primary Examiner* — Ken N Vanderpuye
*Assistant Examiner* — David Lambert
(74) *Attorney, Agent, or Firm* — Maschoff Brennan

(57) ABSTRACT

An example embodiment includes an optical transmission device. The optical transmission device includes an optical source, a collimator lens, and an optical monitor. The optical source is configured to transmit a channel of light. The collimator lens is configured to reflect a portion of the channel of light. The optical monitor is arranged to receive at least a first portion of the reflected channel of light directly from the collimator lens, and is configured to communicate a gross electrical signal representative of received light including the first portion of the reflected channel of light.

15 Claims, 6 Drawing Sheets

OPTICAL SOURCE MONITORING SYSTEM

CROSS REFERENCE TO RELATED APPLICATIONS

This patent application claims priority to and the benefit of U.S. Provisional Patent Application No. 61/780,721, which is incorporated herein by reference in its entirety.

FIELD

Some embodiments discussed herein are related to monitoring optical sources in optical transmission devices.

BACKGROUND

Optical networks may be used to communicate information as optical signals. In some optical networks, optical transmission devices may include one or more optical sources that generate the optical signals. The optical sources may include, laser photo diodes, for instance. The optical signals generally include channels of light transmitted from one or more of the optical sources.

The channels of light may diverge. For example, as the optical signal moves from the optical source, the cross-sectional area of the channel of light may increase. To compensate for divergence, the optical transmission device may include a one or more collimating lenses. For example, the collimating lenses may be included in a focusing assembly. The collimating lenses collect and/or re-organize the channel of light to form a channel of light with essentially parallel rays or a more consistent cross-sectional area.

To monitor the channel of light and/or the optical source, some optical transmission devices may include an optical monitor. The optical monitor generally receives some portion of the optical signal. Based on the received portion of the light, the optical transmission device may be able to obtain information about the optical signal and/or the optical source. For example, an optical monitor may measure power levels of the optical signal transmitted from the optical source. The optical transmission device may then adjust or maintain an operating characteristic of the optical source.

In some optical transmission devices, to receive the portion of the channel of light, a reflecting lens may be positioned between the optical source and the collimator lens. The reflecting lens may redirect the portion of the optical signal to the optical monitor. In some optical sources may emit channels of light from both ends of an optical source cavity. The channel of light emitted from one end of the optical source cavity may be communicated to the optical network. The channel of light emitted from the other end may be emitted towards the optical monitor.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF SOME EXAMPLE EMBODIMENTS

Some embodiments discussed herein are related to monitoring optical sources in optical devices. An example embodiment includes an optical transmission device. The optical transmission device includes an optical source, a collimator lens, and an optical monitor. The optical source is configured to transmit a channel of light. The collimator lens is configured to reflect a portion of the channel of light. The optical monitor is arranged to receive at least a first portion of the reflected channel of light directly from the collimator lens, and is configured to communicate a gross electrical signal representative of received light including the first portion of the reflected channel of light.

Another example embodiment includes an optical transmission device. The optical transmission device including multiple optical sources, multiple collimator lenses, multiple optical monitors, and a controller. Each of the optical sources is configured to transmit a channel of light. Each of the collimator lenses is positioned in relation to a primary optical source of the optical sources such that the channel of light transmitted by the primary optical source is reflected from the collimator lens. Each of the optical monitors is positioned in relation to the one of the collimator lenses such that the optical monitor receives a first portion of a first reflected channel of light transmitted by the primary optical source and a second portion of a second reflected channel of light transmitted by a secondary optical source directly from the collimator lenses. Each of the optical monitors is configured to communicate a gross electrical signal representative of received light including the first portion of the first reflected channel of light and the second portion of the second reflected channel of light. The controller is configured to determine discrete signals representative of the channels of light transmitted by the primary optical sources based on the gross electrical signals.

Another example embodiment includes a method of monitoring an optical system. The optical system includes optical sources, optical monitors, and collimator lenses. The method includes generating a set of coefficients which is configured to indicate quantities of received light to attribute to each of the optical sources. The method includes receiving a gross electrical signal representative of the received light that includes reflected channels of light directly from the collimator lenses. The method includes determining a distinct signal representative of a first channel of light transmitted by a first optical source based on the set of coefficients and the gross electrical signal.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description will be rendered by reference to specific embodiments thereof which are illustrated in the appended drawings. It is appreciated that these drawings depict only example embodiments and are therefore not to be considered limiting of its scope. Some example embodiments of the invention will be described and explained with additional specificity and detail through the use of the accompanying drawings in which.

DETAILED DESCRIPTION OF SOME EXAMPLE EMBODIMENTS

Some embodiments discussed herein are related to monitor optical sources in optical devices. An example embodiment includes an optical transmission device. The optical transmission device includes multiple optical sources. Each of the optical sources transmits a channel of light towards a collimator lens that reflects some portion of the channel of light towards multiple optical monitors. Each of the optical monitors receives the various portions of the reflected channels of light and generates a gross electrical signal representative of received light including the various portions of the reflected channels of light. The gross electrical signals are communicated to a controller, which determines discrete signals. Each of the discrete signals is representative of one of the channels of light transmitted by one of the optical sources. Some additional embodiments are described herein with reference to the accompanying drawings.

Figure 1:
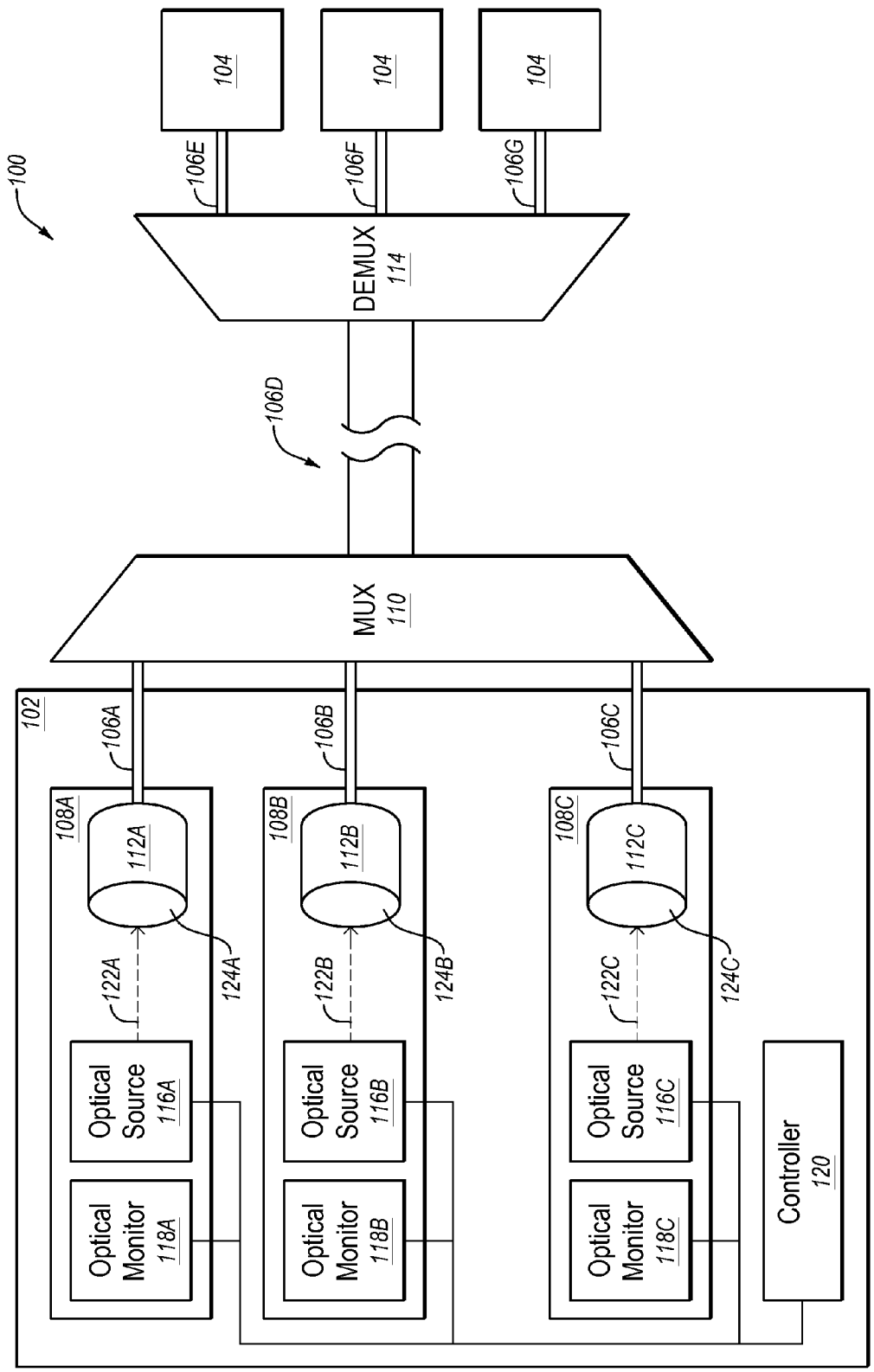
FIG. 1 is a block diagram of an example optical network in which some embodiments disclosed herein may be implemented.

FIG. 1 is a block diagram of an example optical network 100 in which some embodiments disclosed herein may be implemented. The optical network 100 may include a point-to-point optical network, a ring optical network, a mesh optical network, any other suitable optical network, or a combination of two or more optical networks. The components and functionality of the optical network 100 as depicted in FIG. 1 and described herein is configured to communicate multi-channel optical signals. Some details of the communication of the multi-channel optical signals are included below. However, this depiction and description of the optical network 100 is not meant to be limiting. In some embodiments, the optical network 100 may be configured to communicate a single optical signal and may accordingly include different components and functionalities than those specifically described herein.

The optical network 100 communicates optical signals between an optical transmission device 102 and one or more optical receivers 104 (receiver 104 or receivers 104) through optical fibers 106A-106G (generally, optical fiber 106 or optical fibers 106). The optical fibers 106 act as a waveguide for the optical signals communicated in the optical network 100. The optical fibers 106 may include a core surrounded by a cladding layer. The optical fibers 106 may include any suitable type of fiber including, but not limited to, a single-mode fiber (SMF) or a multi-mode fiber (MMF). For example, the optical network 100 may include a first set of optical fibers 106A-106C between one or more focusing assemblies 112A-112C (generally, a focusing assembly 112 or focusing assemblies 112) and a multiplexer (MUX) 110.

The first set of optical fibers 106A-106C may each be SMFs. Additionally the optical network 100 may include a second optical fiber 106D between the MUX 110 and a demultiplexer (DEMUX) 114. The second optical fiber 106D may be a MMF. In addition, the optical network 100 may include a third set of optical fibers 106E-106G between the DEMUX 114 and the receivers 104. The third set of optical fibers 106E-106G may each be SMFs.

The optical transmission device 102 may include any system, apparatus, or device that generates data carrying wavelengths or channels of light. An example of the optical transmission device 102 may be an optical engine that may include the capability of generating 12 or more channels of light at a rate 25 gigabits per second or higher. In some embodiments, different optical signals communicated over the optical network 100 may be assigned to different nominal wavelengths. For example, one channel may be at a first wavelength, with other channels being at other wavelengths spaced apart from each other at a nominal channel spacing, such as 100 gigahertz (GHz), 50 GHz, 25 GHz, or at some other channel spacing. Using different channels for different optical signals generally allows multiple optical signals to be simultaneously communicated over the same optical fiber 106 with limited interference between the multiple optical signals. Each channels of light may communicate a separate optical signal in the optical network 100. In FIG. 1, the channels of light are represented by dashed arrows 122A-122C (generally, channel of light 122 or channels of light 122) that originate at the optical source 116 and end at the focusing assemblies 112. Accordingly, the optical transmission device 102 may include multiple optical transmitters 108A-108C (generally, transmitter 108 or transmitters 108). Each of the transmitters 108 may generate one of the channels of light 122. The multiple channels of light (e.g., one from each transmitter 108) may be combined through a process referred to as wavelength division multiplexing (WDM). WDM generally occurs in the MUX 110. For example, the MUX 110 receives the individual channels of light and combines them into a multi-channel optical signal. The MUX 110 may be positioned within the optical transmission device 102 or the MUX 110 may be positioned outside the optical transmission device 102.

After combining the channels of light, the MUX 110 may output the multi-channel optical signal onto the second optical fiber 106D. Specifically, the multi-channel optical signal may be communicated through the second optical fiber 106D to the DEMUX 114 or to other locations (not shown) in the optical network 100. The DEMUX 114 may be included at one or more destinations of the optical network 100. The DEMUX 114 may be configured to demultiplex or split the multi-channel optical signal into the individual channels included therein. In some embodiments, the DEMUX 114 may be similar to the MUX 104 but configured to split the optical signal into individual channels instead of combine individual channels into one multi-channel optical signal.

The optical network 100 may include the receivers 104 coupled to the DEMUX 114. Each of the receivers 104 may be configured to receive a one of the optical signals output by the DEMUX 114 and process the optical signal for the information contain thereon.

Generally, the transmitters 108 may include any system, apparatus, or device configured to convert one or more electrical signals into an optical signal and to transmit an optical signal. Each of the transmitters 108 may include an optical monitor 118A-118C (generally, optical monitor 118 or optical monitors 118) an optical source 116A-116C (generally optical source 116 or optical sources 116), and one of the focusing assemblies 112. Specifically, a first transmitter 108A may include a first optical monitor 118A, a first optical source 116A, and a first focusing assembly 112A. Additionally, a second transmitter 108B may include a second optical monitor 118B, a second optical source 116B, and a second focusing assembly 112B. Additionally, a third transmitter 108C may include a third optical monitor 118C, a third optical source 116C, and a third focusing assembly 112C.

The optical sources 118 may include any system or apparatus that is configured to generate a channel of light (e.g., 122). For example, the optical sources 118 may include a laser diode, a Fabry-Perot (FP) laser, a distributed feedback (DFB) laser, a vertical-cavity surface-emitting laser (VCSELs) or any other laser that generates a channel of light.

The focusing assemblies 112 may be configured to focus the channel of light prior to communication of the channel of light 122 to one of the first set of optical fibers 106A-106C. For example, when exiting the optical sources 116 the channels of light 122 may diverge or be otherwise disorganized such that the width of the channel of light 122 is too great to be introduced effectively in to one of the first optical fibers 106A-106C. Accordingly, the focusing assemblies 112 may collimate and/or focus the channels of light.

The focusing assemblies 112 may include one or more lenses. For example, the focusing assemblies 112 may include a collimator lens 124A-124C (generally, collimator lens 124 or collimator lenses 124) through which the channel of light 122 may enter the focusing assembly 112. As the channels of light 122 enter the focusing assemblies 112 through the collimator lenses 124, a reflection of some portion of the channel of light 122 may occur. The refection from the collimator lens 124 may be described as a Fresnel reflection.

The optical monitors 118 may include any system or apparatus configured to measure, sense, or otherwise quantify an amount of light that is received by the optical monitor 118. For example, the optical monitors 118 may include a monitor photodiodes, a PIN photodiode, or the like. The optical monitors 118 may be arranged to receive some portion of the reflected channel of light (not shown) directly from the collimator lens 124. As used herein, directly from the collimator lens is intended to mean that the portion does not enter, pass through, refract from, or further reflect off any other object, structure, surface, etc.

For example, the first focusing assembly 112A may be configured to focus a first channel of light 122A prior to communication of the channel of light to one of the first set of optical fibers 106A-106C (e.g., in FIG. 1, the optical fiber 106 coupled to the first focusing assembly 112A). A Fresnel reflection may occur as the first channel of light 122A enters the first focusing assembly 112A through the collimator lens 124A. The first optical monitor 118A may be arranged to receive a portion of the reflected first channel of light directly from the collimator lens 124A.

Likewise, a second focusing assembly 112B may be configured to focus the second channel of light 112B prior to the communication of the second channel of light 122B to another of the first set of optical fibers 106A-106C. A second Fresnel reflection of the second channel of light 122B may occur as the second channel of light 122B enters the second focusing assembly 112B through the second collimator lens 124B. The second optical monitor 118B may be arranged to receive a portion of the second reflected channel of light directly from the collimator lens 124B.

The optical monitors 118 may be configured to communicate a gross electrical signal representative of received light. In the above example, the first optical monitor 118A may communicate a first gross electrical signal representative of at least the portion of the reflected first channel of light.

The optical transmission device 102 may also include a controller 120. The controller 120 may be communicatively coupled to one or more of the optical monitors 118 and/or one or more of the optical sources 116. The controller 120 may further be communicatively coupled to a host system (not shown). The gross electrical signals communicated from the optical monitors 118 may be received and processed by the controller 120. The controller 120 may accordingly monitor the performance of the optical sources 116 through processing the gross electrical signals communicated from the optical monitors 118.

In the depicted embodiment, the optical transmission device 102 includes three transmitters 108, each of which includes a single optical source 116, a signal optical monitor 118, and a single focusing assembly 112. However, this depiction is not meant to be limiting. The optical transmission device 102 may include any number of transmitters 108. For example, in some embodiments, the optical transmission device 102 includes four transmitters 108 each of which generates a channel of light. Additionally, the transmitters 108 may include various types and varying numbers of the optical monitors 118, the optical sources 116, the focusing assemblies 112, etc.

The optical network 100 may additionally include other network element or may include some subset of the elements discussed herein. For example, the optical network 100 may include amplifiers (not shown) and optical add drop multiplexers (OADMs) (not shown). The amplifiers may be positioned throughout the optical network 100 to amplify the multi-channel optical signal. Some examples of the amplifiers may include, but are not limited, to optical repeaters, which may additionally perform opto-electrical or electro-optical conversion; optical fibers doped with a rare-earth element, which excite atoms of the rare-earth element to increase the intensity of the optical signal; erbium-doped fiber amplifiers (EDFA); semiconductor optical amplifier (SOA); or any other suitable amplifier.

The OADMs may include any system, apparatus, or device configured to add and/or drop optical signals from optical fiber 106. For example, each of the OADMs may be configured to add an optical signal of a specific channel to the multi-channel optical signal, and/or to remove (e.g., drop) an optical signal of a specific channel from the multi-channel optical signal. After passing through an OADM, an optical signal may travel along the optical fiber 106 directly to a destination, or the optical signal may be passed through one or more additional OADMs before reaching a destination.

Figure 2A:
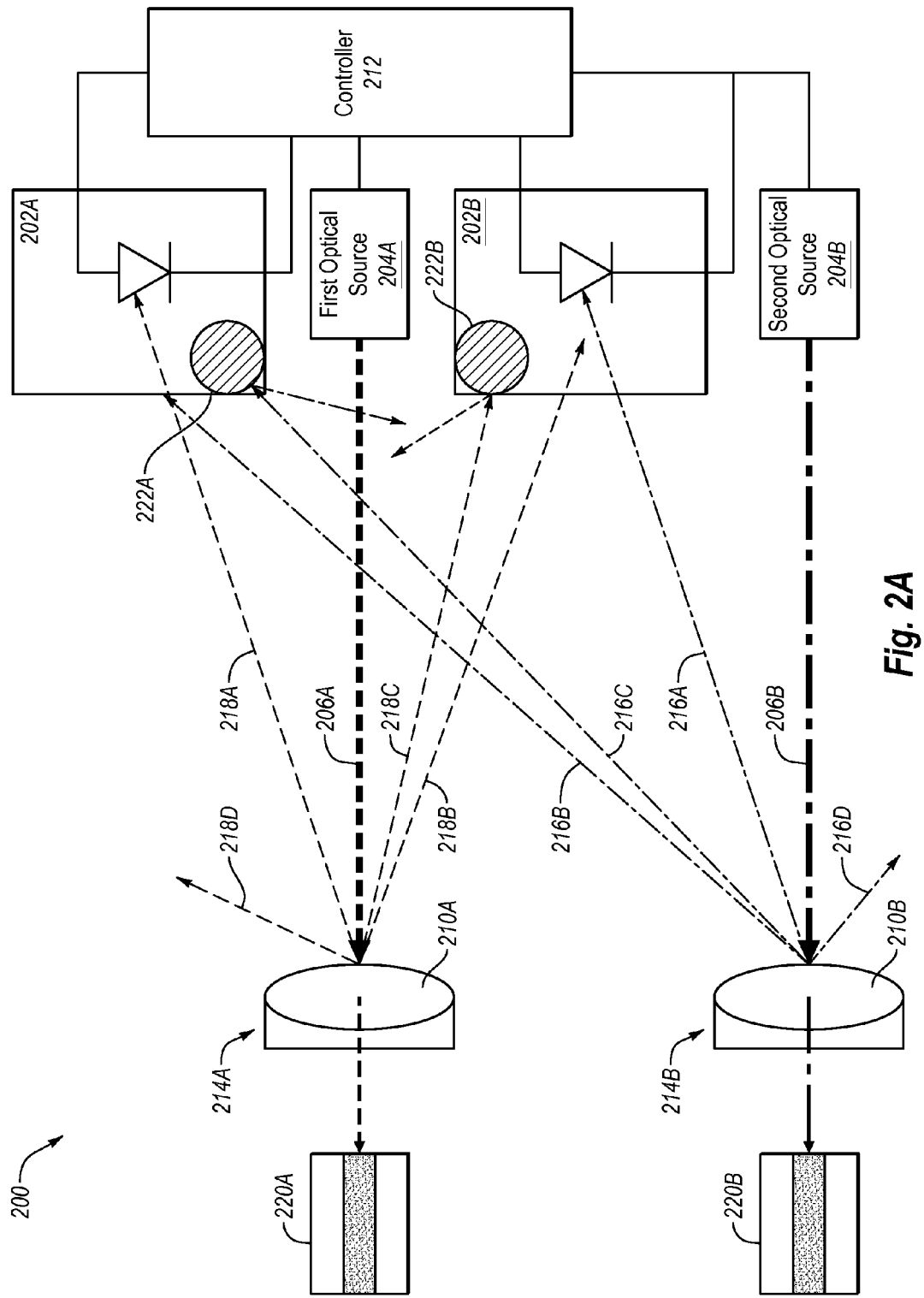
FIG. 2A is a block diagram of an example optical source monitoring system that may be implemented in the optical network of FIG. 1.

FIG. 2A is a block diagram of an optical source monitoring system (monitoring system) 200 that may be implemented in the optical network 100 of FIG. 1. More specifically the monitoring system 200 may be included in the optical transmission device 102 of the optical network 100. In the monitoring system 200, a first and a second optical monitor 202A and 202B (generally, optical monitor 202 or optical monitors 202) measure characteristics of a first and a second channel of light 206A and 206B (generally, channel of light 206 or channels of light 206) originating at a first and a second optical source 204A and 204B (generally, optical source 204 or optical sources 204). The optical monitors 202 receive portions of reflected channels of light 216A-216D and 218A-218D directly from a first and a second collimator lens 210A and 210B (generally, collimator lens 210 or collimator lenses 210).

In addition, the monitoring system 200 may include a controller 212 and a first and a second focusing assembly 214A and 214B (generally, focusing assembly 214 or focusing assemblies 214). Each of the focusing assemblies 214 may include one of the collimator lenses 210. The focusing assemblies 214 may focus and/or collimate the channels of light 206 prior to communication of the channels of light 206 along the optical fibers 220A and 220B. With combined reference to FIGS. 1 and 2A, the optical sources 204 may be similar to and/or correspond to the optical sources 116 of FIG. 1. The focusing assemblies 214 may be similar to and/or correspond to the focusing assemblies 112 of FIG. 1. The optical monitors 202 may be similar to and/or correspond to the optical monitors 118 of FIG. 1. The controller 212 may be similar to and/or correspond to the controller 120 of FIG. 1.

Figure 2B:
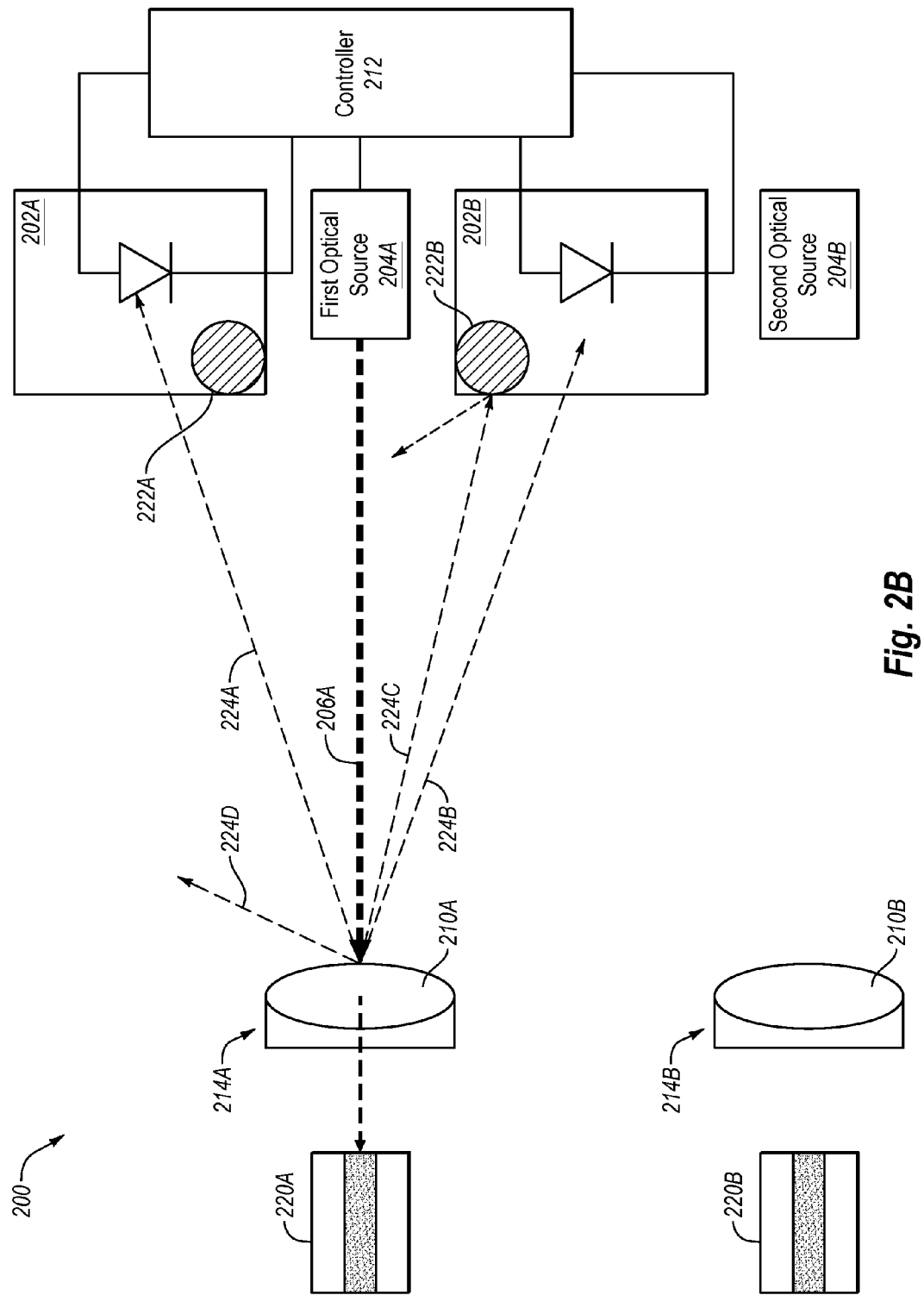
FIGS. 2B and 2C are block diagrams the optical source monitoring system of FIG. 2A in which the controller is generating an example set of coefficients.
Figure 2C:
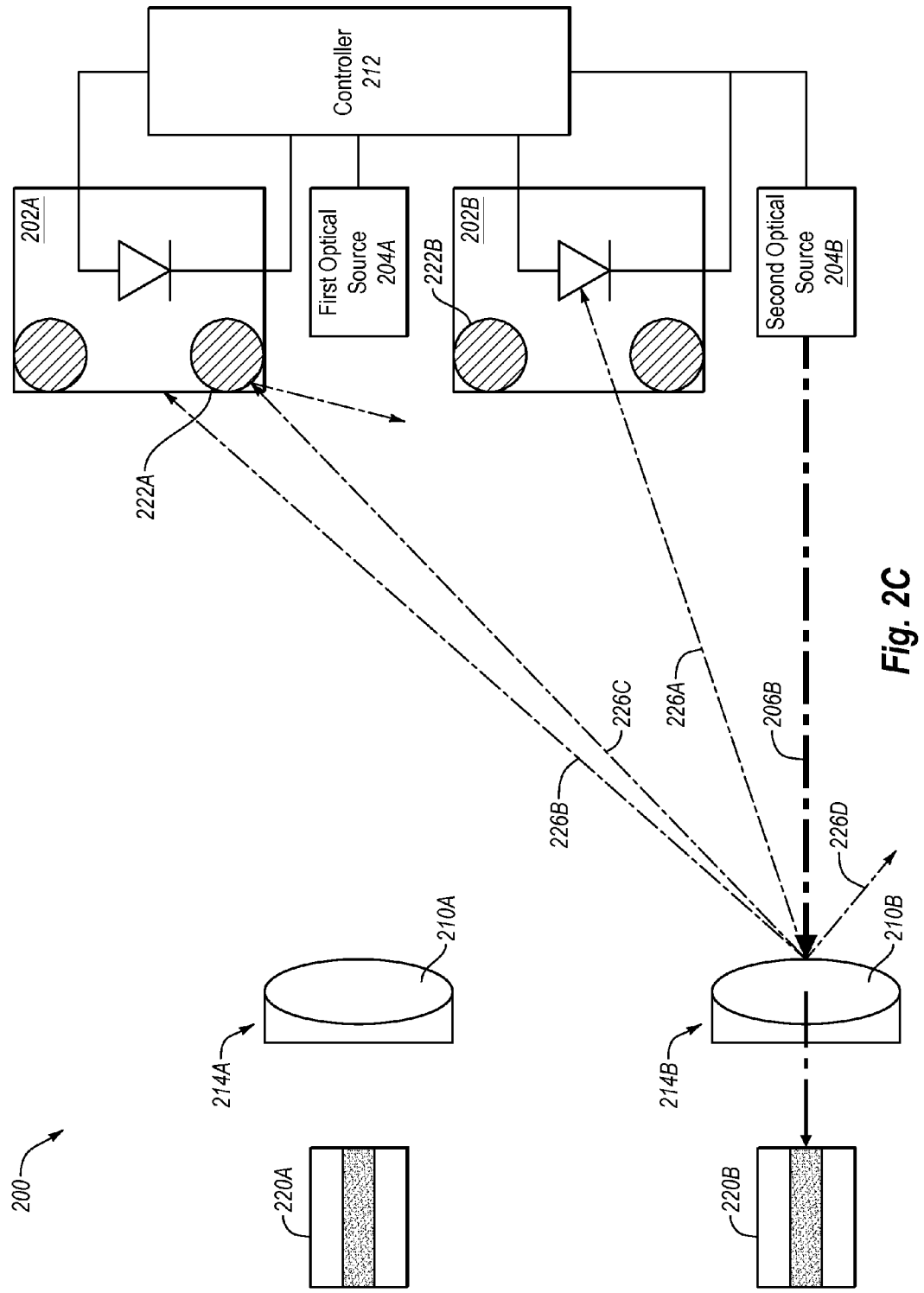

Referring back to FIG. 2A, the monitoring system 200 includes two optical sources 204, two optical monitors 202, and two focusing assemblies 214. This depiction is not meant to be limiting. The monitoring system 200 may include two or more optical sources 204, optical monitors 202, and focusing assemblies 214. FIGS. 2A-2C will be described referencing the monitoring system 200 as depicted. However, the description may be applicable to monitoring systems 200 having two or more of optical sources 204, optical monitors 202, and focusing assemblies 214.

Between the first optical source 204A, the first collimating lens 210A, and the first optical monitor 202A a spatial relationship may exist. Likewise, between the second optical source 204A, the second collimating lens 210B, and the second optical monitor 202B a second spatial relationship may exit. In the context of the first and the second spatial relationships described above, the optical source (e.g. the first or the second optical source 204A or 204B) may be referred to as a primary optical source 204 with respect to the corresponding collimating lens 210 and the corresponding optical monitor 202. For example, the first optical source 204A may be the primary optical source 204 for the first collimating lens 210A and the first optical monitor 202A. Additionally, the second optical source 204B may be a secondary optical source with respect to the first collimating lens 210A and the first optical monitor 202A. Likewise, the second optical source 204A may be the primary optical source 204 for the second collimating lens 210B and the second optical monitor 202B, while the first optical source may be a secondary optical source to the second collimating lens 210B and the second optical monitor 202B.

In monitoring systems 200 including three or more optical sources 204, optical monitors 202, and collimating lenses 210, there may be one optical source 204 which is the primary optical source 204 while all other optical sources 204 may be designated as secondary optical sources. For example in a monitoring system 200 including three optical sources 204, three optical monitors 202, and three collimating lenses 210. Each of the optical monitors 202 and focusing assemblies 214 may be have one primary optical source 204 and two secondary optical sources 204.

The collimating lens 210 may be positioned in relation to the primary optical sources 204 such that the channel of light 206 transmitted by the primary optical source may enter the focusing assembly 214 through the collimator lens 210. As the channel of light 206 enters the focusing assembly 214, at least a portion of the channel of light 206 transmitted by the primary optical source 204 may be reflected from the collimator lens 210.

For example, the first focusing assemblies 214A may be positioned in relation to the primary optical sources 204A (e.g., the first optical source 204A) such that the first channel of light 206A is transmitted by the primary optical source 204A may enter the first focusing assembly 214A through the first collimator lens 210A. As the first channel of light 206A enters the first focusing assembly 214A, a portion (e.g., 218A-218D) of the first channel of light 206A transmitted by the first optical source 204A is reflected from the first collimator lens 210A.

Likewise, the second focusing assemblies 214B may be positioned in relation to the primary optical sources 204B (e.g., the second optical source 204B) such that the second channel of light 206B is transmitted by the primary optical source 204B may enter the second focusing assembly 214B through the second collimator lens 210B. As the second channel of light 206B enters the second focusing assembly 214B, a portion (e.g., 216A-216D) of the second channel of light 206B transmitted by the second optical source 204B is reflected from the second collimator lens 210B. The transmission of the first channel of light and the second channel of light may occur with some temporal overlap.

The reflection of the channels of light 206 from the collimator lenses 210 may generate multiple portions of the reflected channels of light 216A-216D and 218A-218D. Specifically, the first channel of light 206A may reflect off of the first collimator lens 210A creating a first portion of a first reflected channel of light 218A, a second portion of a first reflected channel of light 218B, a third portion of a first reflected channel of light 218C, and a fourth portion of a first reflected channel of light 218D. Likewise, the second channel of light 206B may reflect off of the second collimator lens 210B creating a first portion of a second reflected channel of light 216A, a second portion of a second reflected channel of light 216B, a third portion of a second reflected channel of light 216C, and a fourth portion of a second reflected channel of light 216D.

In some embodiments, one or more of the collimator lenses 210 may be shaped to direct the portions of the reflected channels of light 216A-216D and 218A-218D towards one of the optical monitors 202. For example in some embodiments, the collimator lenses 210 may be is laterally symmetric and rotationally asymmetric.

Additionally, the collimator lenses 210 may be positioned in relation to a corresponding optical monitor 202. The collimator lenses 210 may be positioned such that the optical monitor 202 receives the first portion of the reflected channel of light 218A or 216A of the primary optical source 204 and a second portion of a reflected channel of light 218B or 216B of a secondary optical source. For example, the first optical monitor 202A may be positioned with respect to the first collimator lenses 210A such that the first optical monitor 202A receives the first portion of the first reflected channel of light 218A and the second portion of the second reflected channel of light 216B. Likewise, the second optical monitor 202B may be positioned with respect to the second collimator lenses 210B such that the second optical monitor 202B receives the first portion of the second reflected channel of light 216A and the second portion of the first reflected channel of light 218B. The optical monitors 202 may receive the portions of the reflected channels of light (e.g. first portion of the first reflected channel of light 218A and the second portion of the second reflected channel of light 216B or the first portion of the second reflected channel of light 216A and the second portion of the first reflected channel of light 218B) directly from the collimator lenses 210.

The optical monitors 202 may generate gross electrical signals representative of received light. For example, the optical monitors 202 may be monitor photodiodes that generate an electrical signal that corresponds to the amount of light received by a photo-sensitive element. Accordingly, the gross electrical signals may be representative of the first portion of the reflected channel of light 218A or 216A of the primary optical source 204 and a second portion of a reflected channel of light 218B or 216B of a secondary optical source. Each of the optical monitors 202 may communicate the gross electrical signals representative of received light to the controller 212.

The controller 212 may receive the gross electrical signals from each of the optical monitors 202. The controller 212 may be configured to determine discrete signals from the gross electrical signals. Generally, the discrete signals may be representative of the first portion of the reflected channel of light 218A or 216A transmitted by the primary optical source.

For example, the first optical monitor 202A may communicate a first gross electrical signal representative of the first portion of the first reflected channel of light 218A and the second portion of the second reflected channel of light 216B. The controller 212 may determine a first discrete signal representative of the first portion of the first reflected channel of light 218A from the first gross electrical signal. Likewise, the second optical monitor 202B may communicate a second gross electrical signal representative of the first portion of the second reflected channel of light 216A and the second portion of the first reflected channel of light 218B. The controller 212 may determine a second discrete signal representative of the first portion of the second reflected channel of light 216A from the second gross electrical signal.

In some embodiments, the controller 212 may determine the discrete signals by generating a set of coefficients indicating quantities of the gross electrical signals to attribute to each of the optical sources 204. For example, the set of coefficients may indicate that a certain percentage or proportion of the first gross electrical signal may be attributed to the second optical source 204B. The controller 212 may then subtract a corresponding quantity from the first gross electrical signal to determine the first discrete signal. Some additional details of generating the set of coefficients are included below.

The monitoring system 200 may include one or more protrusions 222A and 222B. The protrusions 222A and 222B may be configured to interrupt a third portion of the reflected channel of light (e.g., 218C and 216C) of one or more secondary optical sources. Specifically, the first protrusion 222A included in the first optical monitor 202A may be configured to interrupt the third portion of the second reflected channel of light 216C. Likewise, the second protrusion 222B included in the second optical monitor 202B may be configured to interrupt the third portion of the first reflected channel of light 218C. As illustrated in FIG. 2A, the protrusions 222A and 222B may be included on the optical monitors 202. Additionally or alternatively, the protrusions 222A and 222B may be an independent or semi-independent structure and may take any shape. Some examples of protrusions 222A and 222B may include, but are not limited to, posts, solder bumps, reflective surfaces, and absorptive surfaces.

FIGS. 2B and 2C depict the monitoring system 200 of FIG. 2A in which the controller 212 is generating a set of coefficients in some embodiments. With specific reference to FIG. 2B, the controller 212 may be configured to generate the set of coefficients by energizing the first optical source 204A such that a first channel of light 206A of a first known power level is transmitted towards the first collimator lens 210A. During this time the second optical source 204B is not energized, thus the light in the monitoring system 200 is transmitted by the first optical source 204A.

The first channel of light 206A may be reflected from the first collimator lens 210A creating multiple reflected beams of light 224A-224D, some subset of which may be received by the first optical monitor 202A and the second optical monitor 202B. The controller 212 may measure a first gross calibration electrical signal at the first optical monitor 202A representative of a first reflected beam of light 224A. Additionally, the controller 212 may measure a second gross calibration electrical signal at the second optical monitor 202B representative of a second reflected beam of light 224B. The following equations may describe the first and the second gross calibration electrical signals:

$$a_1 PL_1 = CS_{PL1_1}$$

$$a_2 PL_1 = CS_{PL1_2}$$

In the above equations, $CS_{PL1_1}$ may represent the first gross calibration electrical signal measured at the first optical monitor 202A. Likewise, $CS_{PL1_2}$ may represent the second gross calibration electrical signal measured at the second optical monitor 202B. $PL_1$ may represent the known power level of the first channel of light 206A. The variables $a_1$ and $a_2$ may represent a first coefficient and a second coefficient, respectively.

Accordingly, the controller 212 may calculate the first coefficient as a ratio of the first gross calibration electrical signal to the first known power level. Additionally, the controller 212 may calculate a second coefficient as a ratio of the second gross calibration electrical signal to the first known power level.

With reference to FIG. 2C, the controller 212 may be further configured to generate the set of coefficients by energizing the second optical source 204B such that the second channel of light 206B of a second known power level is transmitted towards the second collimator lens 210B. During this time, the first optical source 204A is not energized, thus the light in the monitoring system 200 is transmitted by the second optical source 204B.

The second channel of light 206B may be reflected from the second collimator lens 210B creating multiple reflected beams of light 226A-226D, some subset of which may be receive by the second optical monitor 202B and the first optical monitor 202A. The controller 212 may measure a third gross calibration electrical signal at the first optical monitor 202A. Additionally, the controller 212 may measure a fourth gross calibration electrical signal at the second optical monitor 202B. The third gross calibration electrical signal may be representative of a third reflected beam of light 226B and the fourth gross calibration electrical signal may be representative of a fourth reflected beam of light 226A. The following equations may describe the third and fourth gross calibration electrical signals:

$$b_1 PL_2 = CS_{PL2_1}$$

$$b_2 PL_2 = CS_{PL2_2}$$

In the immediately above equations, $CS_{PL2_1}$ may represent the third gross calibration electrical signal measured at the first optical monitor 202A. Likewise, $CS_{PL2_2}$ may represent the fourth gross calibration electrical signal measured at the second optical monitor 202B. $PL_2$ may represent the second known power level of the second channel of light 206B. The variables $b_1$ and $b_2$ represent a third coefficient and a fourth coefficient, respectively.

Accordingly, the controller 212 may calculate the third coefficient as a ratio of the third gross calibration electrical signal to the second known power level. Additionally, the controller 212 may calculate the fourth coefficient as a ratio of the fourth gross calibration electrical signal to the second known power level.

Generally, each of the coefficients indicates a quantity of the gross electrical signal measured at a particular optical monitor 202 to attribute to a particular optical source 204. Thus, referring back to FIG. 2A, the gross electrical signals measured by the first optical monitor 202A and the second optical monitor 202B may be described by the following equations:

$$a_1L_1+b_1L_2=GS_1$$

$$a_2L_1+b_2L_2=GS_2$$

In the immediately foregoing equations, the $GS_1$, and $GS_2$, may represent gross electrical signals communicated from the first optical monitors 202A and the second optical monitor 202B, respectively. The variables $L_1$ and $L_2$ may represent a total power the channels of light 206 transmitted by the corresponding optical sources 204. For example, $L_1$ may represent the total power of the first channel of light 206A transmitted by the first optical source 204A. The variables $a_1$-$a_2$ and $b_1$-$b_2$ may represent the set of coefficients determined above.

The foregoing equation describes each of the gross electrical signals as a sum of contributions from each of the optical sources 204. The contributions from each of the optical sources 204 are equal to some proportion of the total power of the channel of light 206 multiplied by a corresponding coefficient. With reference to FIG. 2A, the first gross electrical signal is equal to the first portion of the first reflected channel of light 218A added to the second portion of the second reflected channel of light 216B. The coefficients $a_1$ and $b_1$ represent the amount or quantity of the channel of light 206B included in the "first portion" of first portion of the first reflected channel of light 218A and the "second portion" of the second portion of the second reflected channel of light 216B.

To solve the foregoing equation, it may be written in matrix form:

$$\begin{bmatrix} a_1 & b_1 \\ a_2 & b_2 \end{bmatrix} \begin{bmatrix} L_1 \\ L_2 \end{bmatrix} = \begin{bmatrix} GS_1 \\ GS_2 \end{bmatrix}$$

In the matrix form of the foregoing equation, $a_1$, $a_2$, $b_1$, and $b_2$ are the determined (e.g., known) coefficients and $GS_1$ and $GS_2$ are measured. Thus, $L_1$ and $L_2$ may be solved for through using matrix algebra. Combining the first, second, third, and fourth coefficients may result in the set of coefficients described by the matrix:

$$\begin{bmatrix} a_1 & b_1 \\ a_2 & b_2 \end{bmatrix}$$

More generally, the processes described above for generating the set of coefficients may be expanded for applicability in monitoring systems 200 including any number of optical sources 202, optical monitors 204, and focusing assemblies 214. General calibration equations below may describe the generation of a set of coefficients by sequentially energizing one optical source 202 to a known power level:

$$a_1PL_1=CS_{PL1_1} \; b_1PL_2=CS_{PL2_1} \; \lambda_1PL_n=CS_{PLn_1}$$

$$a_2PL_1=CS_{PL1_2} \; b_2PL_2=CS_{PL2_2} \; \lambda_2PL_n=CS_{PLn_2}$$

$$\vdots \quad \ldots \quad \vdots$$

$$a_nPL_1=CS_{PL1_n} \; b_nPL_2=CS_{PL2_n} \; \lambda_nPL_n=CS_{PLn_n}$$

In the forgoing general calibration equations, $a_1$-$a_n$ may represent the coefficients quantifying the amount of light to attribute to a first channel of light having a first power level, $PL_1$. Specifically, $a_1$ represents amount of light to attribute to a first channel of light at a first optical monitor 202A, $a_2$ represents amount of light to attribute to the first channel of light at a second optical monitor 202B, and $a_n$ represents amount of light to attribute to the first channel of light at an Nth optical monitor (not shown). Likewise, $b_1$-$b_n$ may represent the amount of light to attribute to a second channel of light having a second known power level, $PL_2$ at each of the optical monitor 202 and $\lambda_1$-$\lambda_n$ may represent the amount of light to attribute to an Nth channel of light having an Nth known power level $PL_n$ at each of the optical monitor 202. Additionally, in forgoing general calibration equations, the variables $PL_1$-$PL_n$ in this set of equations are equal to the known power levels of the channels of light and $CSP_{L1_1}$-$CSP_{Ln_n}$ represent the gross calibration electrical signal measured at one of the optical monitors 202. Accordingly, each of $a_1$-$a_n$, $b_1$-$b_n$, and $\lambda_1$-$\lambda_n$ may be calculated as a ratio of the gross calibration electrical signal to the known power level.

A set of general gross electrical signals may be described by the equations:

$$a_1L_1+b_1L_2 \ldots +\lambda_1L_n=GS_1$$

$$a_2L_1+b_2L_2 \ldots +\lambda_2L_n=GS_2$$

$$\ldots$$

$$a_nL_1+b_nL_2 \ldots +\lambda_nL_n=GS_n$$

In foregoing equation for general gross electrical signals, $GS_1$, $GS_2$, and $GS_n$ may represent gross electrical signals communicated from one of the optical monitors 202. Specifically, $GS_1$ may represent a first gross electrical signal communicated from the first optical monitor 202A, $GS_2$ represents a second gross electrical signal communicated from the second optical monitor 202B, etc. The variables $L_1$-$L_n$ may represent a total power of one of the channels of light 206 transmitted by a corresponding optical source 204. For example, $L_1$ represent the total power of the first channel of light 206A transmitted by the first optical source 204A. The variables $a_1$-$a_n$, $b_1$-$b_n$, and $\lambda_1$-$\lambda_n$ may represent coefficients determined above.

For example, in the top equation $a_1L_1+b_1L_2 \ldots \lambda_1L_n=GS_1$, the first gross electrical signal $GS_1$ may be equal to a sum of first coefficient multiplied by the total power of the first channel of light $a_1L_1$, a second coefficient multiplied by the total power of the second channel of light $b_1L_2$, and an Nth coefficient of an Nth channel of light $\lambda_1L_n$. To calculate the discrete signal representative of the first optical source 204A (e.g., $L_1$), the second coefficient multiplied by the total power of the second channel of light ($b_1L_2$) and the Nth coefficient of the Nth channel of light ($\lambda_1L_n$) may be subtracted from the first gross electrical ($GS_1$). The difference may be divided by $a_1$ as determined above during the calibration.

In some embodiments, the coefficients may be approximately equal. For example:

$$b_1 \approx a_1 \approx \lambda_1$$

However, by including the protrusions 222, one of the coefficients may be increased in relation to the coefficients related to the other optical coefficients. For example, the coefficient corresponding to the primary optical source may be increased with respect to the other coefficients. A resulting relationship may be described by the equation:

$$b_1 << a_1 >> \lambda_1$$

The set of general gross electrical signals may be represented in matrix form by the equation below:

$$\begin{bmatrix} a_1 & b_1 & \ldots & \lambda_1 \\ a_2 & b_2 & \ldots & \lambda_2 \\ \vdots & \vdots & \ldots & \vdots \\ a_n & b_n & \ldots & \lambda_n \end{bmatrix} \begin{bmatrix} L_1 \\ L_2 \\ \vdots \\ L_n \end{bmatrix} = \begin{bmatrix} GS_1 \\ GS_2 \\ \vdots \\ GS_n \end{bmatrix}$$

The variables in the matrix form of the general gross electrical signals represent the similar to values discussed above with respect to the general gross electrical signals. In matrix form, a first matrix (starting from the left side) including $a_1$-$a_n$, $b_1$-$b_n$, and $\lambda_1$-$\lambda_n$ represents the set of coefficients. Additionally, a second matrix including the variables $L_1$-$L_n$ that may represent total powers of each of the channels of light. Additionally or alternatively, in some embodiments, the variables $L_1$-$L_n$ may include discrete signals and/or the second matrix including the variables $L_1$-$L_n$ may be a basis from which the discrete signals are derived.

In some embodiments, during the generation of the coefficients the power level of the channel of light 206 may not be known. With reference to FIG. 2B, the first optical source 204A may be energized such that the first channel of light 206B is transmitted against the collimator lens 210A. However, rather than the controller 212 knowing the power level of the first channel of light 206A, the controller 212 measures the total received light in the monitoring system 200. Based on total received light, the controller 212 may generate the set of coefficients. Specifically, the set of coefficients, may be equal a proportion of light received at each optical monitor 202 to the total received light at all the optical monitors 202. For example, the following equations may describe the first and the second coefficients calculated without a known power level of the channel of light 206:

$$a_1RL_1 = CS_{RL1_1}$$

$$a_2RL_1 = CS_{RL1_2}$$

$$a_1 + a_2 = 1$$

In the above equations, $CS_{RL1_1}$ may represent a first gross calibration electrical signal measured at the first optical monitor 202A. Likewise, $CS_{RL1_2}$ may represent the second gross calibration electrical signal measured at the second optical monitor 202B. $RL_1$ may represent the total received light of the first channel of light 206A. The variables $a_1$ and $a_2$ may represent a first coefficient and a second coefficient, respectively.

Accordingly, the controller 212 may calculate the first coefficient as a ratio of the first gross calibration electrical signal to the total received light. The total received light may be equal to the sum of the first gross calibration electrical signal and the second gross calibration electrical signal. Additionally, the controller 212 may calculate a second coefficient as a ratio of the second gross calibration electrical signal to the first known power level. Any number of remaining coefficients may be generated in a fashion similar to that discussed above.

A second set of general gross electrical signals may be described by the equations:

$$a_1RL_1 + b_1RL_2 \ldots + \lambda_1RL_n = GS_1$$

$$a_2RL_1 + b_2RL_2 \ldots + \lambda_2RL_n = GS_2$$

$$\ldots$$

$$a_nRL_1 + b_nRL_2 \ldots + \lambda_nRL_n = GS_n$$

In foregoing equation for general gross electrical signals, $GS_1$, $GS_2$, and $GS_n$ may represent gross electrical signals communicated from one of the optical monitors 202. Specifically, $GS_1$ may represent a first gross electrical signal communicated from the first optical monitor 202A, $GS_2$ represents a second gross electrical signal communicated from the second optical monitor 202B, etc. The variables $RL_1$-$RL_n$ represent a total received power of one of the channels of light 206 transmitted by a corresponding optical source 204. For example, $RL_1$ may represent the total received power of the first channel of light 206A transmitted by the first optical source 204A. The variables $a_1$-$a_n$, $b_1$-$b_n$, and $\lambda_1$-$\lambda_n$ may represent the coefficients determined above.

Solving the foregoing equation is described above through matrix algebra. However, the variables $RL_1$-$RL_n$ represent a total received power of one of the channels of light 206. Thus, in embodiments in which the power level may not be known when generating the coefficients, the controller 212 may include different processing to relate the total received light (e.g., variables $RL_1$-$RL_n$) to one of the channels of light 206 and/or one or more characteristics of the corresponding optical source 204.

Calculation of the discrete signals may include multiplying a gross electrical signal received during operation at one of the optical monitors 202 by a corresponding coefficient. For example, to calculate a first discrete signal for the first optical source 204A, a first coefficient $a_1$ by a first gross electrical signal received during operation at the first optical monitor 202A and a second discrete signal for the second optical source 204B, a second coefficient $b_2$ by a second gross electrical signal received during operation at the second optical monitor 202B.

The steps described herein from which the set of coefficients are determined are not meant to be limiting. The set of coefficients may be determined in multiple other ways. For example, in some embodiments, both (or all) the of the optical sources 204A and 204B may be simultaneously operated, then individually turned off to measure contributions of each of the optical sources 204A and 204B. Additionally or alternatively, sets of secondary optical sources 204 may be operated simultaneously to measure contributions from combinations of secondary optical sources 204. Additionally or alternatively, one or more of the optical sources 204 may be operated at different power levels to measure individual contribution variations which can be factored into the set of coefficients.

Figure 3:
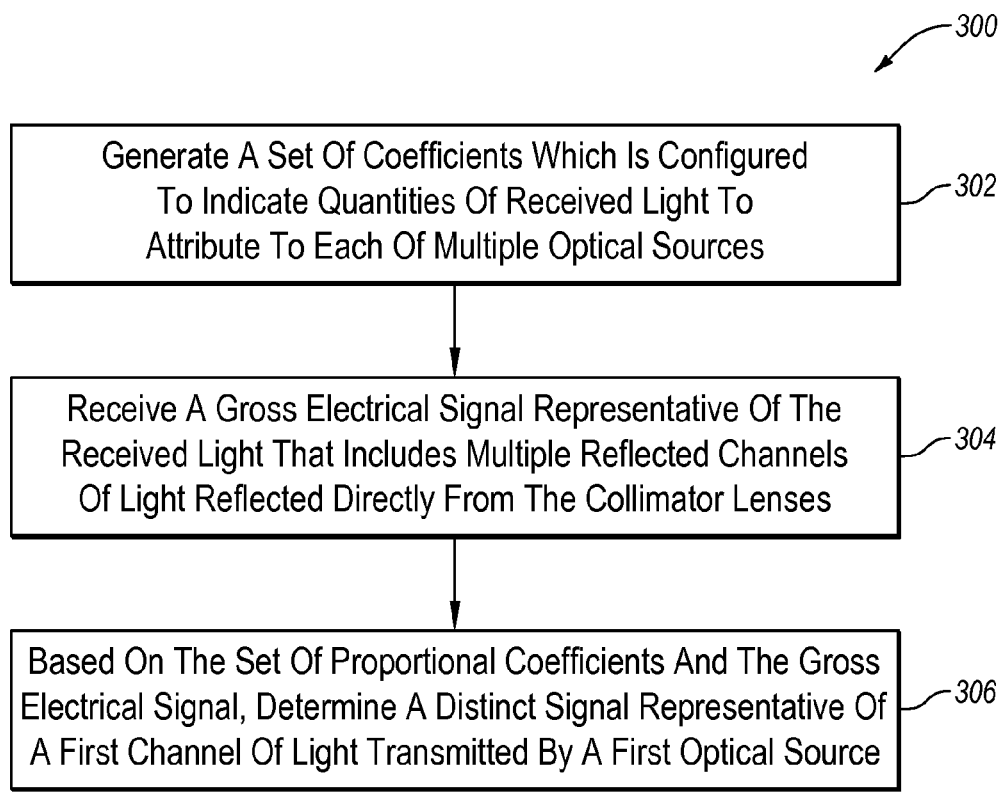
FIG. 3 is a flow diagram of an example method of monitoring an optical system.

FIG. 3 is a flow diagram of an example method 300 of monitoring an optical system, which may include multiple optical sources, multiple optical monitors, and multiple focusing assemblies with collimator lenses such as those described with respect to FIGS. 2A-2C. The method 300 may be implemented in the optical network 100 or in the monitoring system 200 of FIGS. 2A-2C, in some embodiments. For example, the method 300 (including the operations in the various blocks described below) may be performed in some embodiments by the controller 120 that may include or may be communicatively coupled to a non-transitory computer-readable medium having thereon computer-readable instructions, which in response to execution by a processor, cause the processor to perform or control performance of the method 300. The controller 120 in some embodiments may be implemented by such computer-readable instructions stored on a non-transitory computer-readable medium (such as a memory) and executable by one or more processors. Although illustrated as discrete blocks, various blocks may be divided into additional blocks, supplemented with additional blocks, combined into fewer blocks, or eliminated, depending on the particular implementation.

The method 300 may begin at 302 by generating a set of coefficients which is configured to indicate quantities of received light to attribute to each of multiple optical sources. In some embodiments, generating the set of coefficients may include a first optical source being energized such that the first optical source transmits a channel of light of a known power level. While the first optical source is transmitting the channel of light, a set of gross calibration electrical signals may be received at the plurality of optical monitors. From the set of gross calibration electrical signals, a first subset of coefficients for the first optical source may be calculated. For example, the first subset of coefficients may be calculated by dividing each of the set of gross calibration electrical signals by the known power level.

In some embodiments, generating the set of coefficients may include energizing a first optical source. While the first optical source is transmitting a channel of light, a set of gross calibration electrical signals may be received at multiple optical monitors. From the set of gross calibration electrical signals, a first subset of coefficients for the first optical source may be calculated by dividing each of the set of gross calibration electrical signals by a sum of each of the set of gross calibration electrical signals.

At 304, the method 300 may include receiving a gross electrical signal representative of the received light that includes multiple reflected channels of light directly from the collimator lenses. At 306, based on the set of coefficients and the gross electrical signal, the method 300 may include determining a distinct signal representative of a first channel of light transmitted by a first optical source. Additionally, in some embodiments, the method 300 may include interrupting a portion of the plurality of channels of light reflected directly from the collimator lenses.

For this and other procedures and methods disclosed herein, the functions performed in the processes and methods may be implemented in differing order. Furthermore, the outlined operations are only provided as examples, and some of the operations may be optional, combined into fewer operations, supplemented with other operations, or expanded into additional operations without detracting from the disclosed embodiments.

Figure 4:
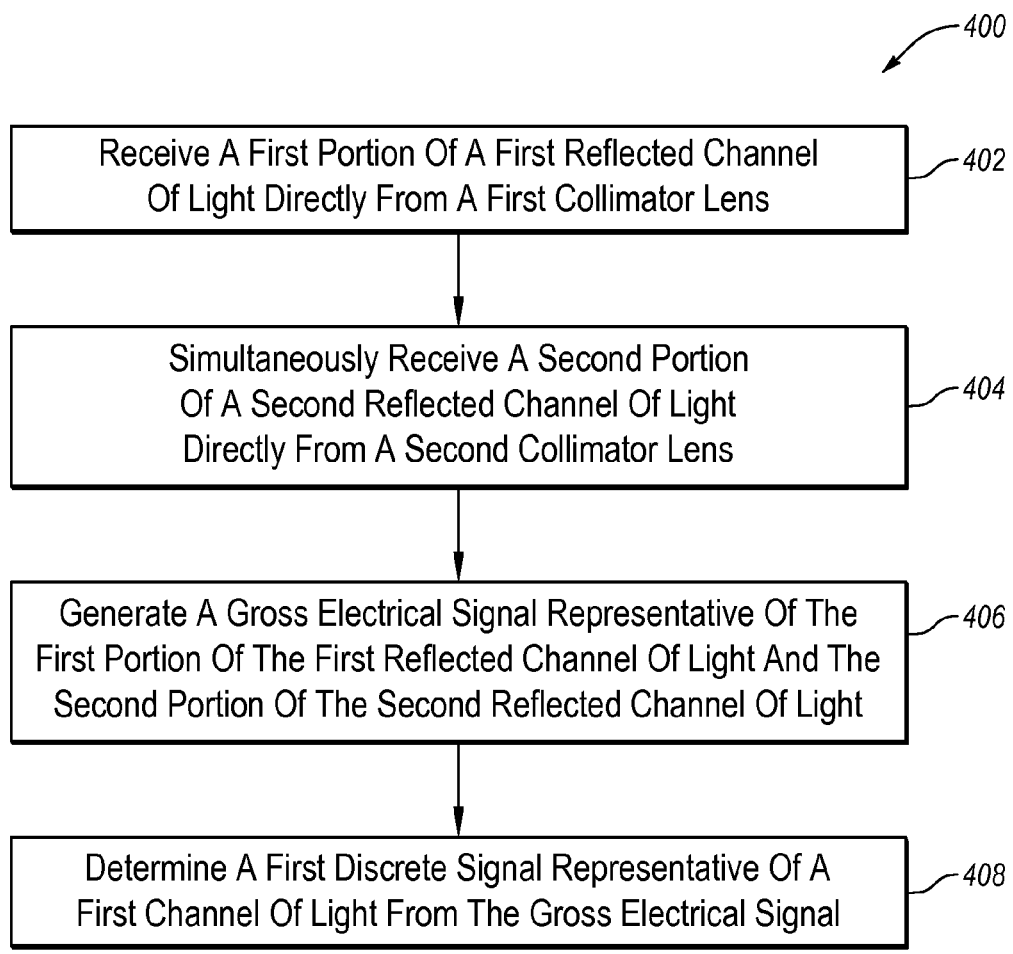
FIG. 4 is a flow diagram of another example method of monitoring multiple optical sources.

FIG. 4 is a flow diagram of an example method 400 of monitoring multiple optical sources. The method 400 may be implemented in the optical network 100 or in the monitoring system 200 of FIGS. 2A-2C, in some embodiments. For example, the method 400 (including the operations in the various blocks described below) may be performed in some embodiments by the controller 120 that may include or may be communicatively coupled to a non-transitory computer-readable medium having thereon computer-readable instructions, which in response to execution by a processor, cause the processor to perform or control performance of the method 400. The controller 120 in some embodiments may be implemented by such computer-readable instructions stored on a non-transitory computer-readable medium (such as a memory) and executable by one or more processors. Although illustrated as discrete blocks, various blocks may be divided into additional blocks, supplemented with additional blocks, combined into fewer blocks, or eliminated, depending on the particular implementation.

The method 400 may begin at 402 by receiving a first portion of a reflected first channel of light directly from a first collimator lens. By directly from the first collimator lens, the first portion does not enter, pass through, refract from, or further reflect off any other object, structure, surface, etc. At 404, the method 400 may include simultaneously receiving a second portion of second reflected channel of light directly from a second collimator lens.

At 406, the method 400 may include generating a gross electrical signal representative of the first portion of the first reflected channel of light and the second portion of the second reflected channel of light. In some embodiments, the generating a gross electrical signal may be a result of the first portion of the first reflected channel of light and the received second portion of the second reflected channel of light entering an optical monitor.

At 408, the method 400 may include determining a first discrete signal representative of a first channel of light from the gross electrical signal. In some embodiments, determining the first discrete signal may include generating a set of coefficients. The set of coefficients may indicate the quantity of the gross electrical signal attributed to the received first portion of the first reflected channel and the received second portion of the second reflected channel of light.

Additionally, generating the set of coefficients may include a first optical source being energized such that a channel of light of a first known power level is transmitted towards the first collimator lens. A set of gross calibration electrical signals may then be measured. From the gross calibration electrical signals, the set of coefficients may be calculated. For example, the set of coefficients may be calculated as a ratio set of gross calibration electrical signals to the first known power level.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Some embodiments may take other specific forms without departing from the scope of the present description. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transmission device comprising:
   a first optical source configured to transmit a first channel of light having a power level that is not known;
   a first collimator lens configured to collimate the first channel of light and to reflect a portion of the first channel of light as a first reflected channel of light, wherein the first reflected channel of light is a Fresnel reflection from the first collimator lens;
   a first optical monitor arranged to receive at least a first portion of the first reflected channel of light directly from the first collimator lens, and configured to communicate a first gross calibration electrical signal representative of received light including the first portion of the first reflected channel of light;
   a second optical monitor arranged to receive a second portion of the first reflected channel of light directly from the first collimator lens and configured to communicate a second gross calibration electrical signal representative of received light including the second portion of the first reflected channel of light; and
   a controller configured to calculate a first coefficient and a second coefficient from the first gross calibration electrical signal and the second gross calibration electrical signal,
   wherein the first gross calibration electrical signal, the second gross calibration electrical signal, the first coefficient, and the second coefficient are defined according to equations:

$$a_1 RL_1 = CS_{RL1_1};$$

$$a_2 RL_1 = CS_{RL1_2}; \text{ and}$$

$$a_1 + a_2 = 1; \text{ in which:}$$

$CS_{RL1_1}$ represents the first gross calibration electrical signal;
   $CS_{RL1_2}$ represents the second gross calibration electrical signal;
   $RL_1$ represents the first reflected channel of light; and
   $a_1$ and $a_2$ represent the first coefficient and the second coefficient, respectively.

2. The optical transmission device of claim 1, further comprising:
   a second optical source configured to transmit a second channel of light; and
   a second collimator lens configured to collimate the second channel of light and to reflect a portion of the second channel of light as a second reflected channel of light, wherein:
   the first optical source is configured to transmit an additional channel of light, a portion of which is reflected from a surface of the first collimator lens;
   the first optical monitor and the second optical monitor are configured to communicate to the controller gross electrical signals representative of received light;
   the controller is further configured to determine discrete signals based on the gross electrical signals, the first coefficient, and the second coefficient.

3. The optical transmission device of claim 2, wherein:
   the first optical monitor includes a protrusion on the first optical monitor configured to interrupt a portion of the second reflected channel of light; and
   the second optical monitor includes a second protrusion on the second optical monitor configured to interrupt a third portion of the first reflected channel of light.

4. The optical transmission device of claim 1, wherein the collimator lens is shaped to direct the reflected channel of light towards the optical monitor.

5. An optical transmission device comprising:
   a first optical source configured to transmit a first channel of light having a power level that is not known;
   a first collimator lens positioned in relation to the first optical source such that the first channel of light transmitted by the first optical source is collimated by a first collimator lens and a portion of the first channel of light is reflected as a corresponding Fresnel reflection therefrom;
   a first optical monitor positioned in relation to the first collimator lens such that the first optical monitor receives a first portion of the reflected portion of the first channel of light;
   a second optical monitor positioned in relation to the first collimator lens such that the second optical monitor receives a second portion of the reflected portion of the first channel of light;
   the first optical monitor is configured to communicate a first gross calibration electrical signal that is representative of received light including the first portion of the reflected portion of the first channel of light;
   the second optical monitor is configured to communicate a second gross calibration electrical signal that is representative of received light including the second portion of the reflected portion of the first channel of light; and a controller that is configured to calculate a first coefficient and a second coefficient from the first gross calibration electrical signal and the second gross calibration electrical signal, wherein the first gross calibration electrical signal, the second gross calibration electrical signal, the first coefficient and the second coefficient are defined according to equations:

$a_1 RL_1 = CS_{RL11}$;

$a_2 RL_1 = CS_{RL12}$; and $a_1 + a_2 = 1$; in which:

$CS_{RL11}$ represents the first gross calibration electrical signal;

$CS_{RL12}$ represents the second gross calibration electrical signal;

$RL_1$ represents the first reflected channel of light; and $a_1$ and $a_2$ represent the first coefficient and the second coefficient, respectively.

6. The optical transmission device of claim 5, further comprising one or more optical sources, wherein:
the controller is further configured to:
receive a gross electrical signal representative of received light that includes a plurality of reflected channels of light directly from the first and second collimator lenses; and
determine a plurality of discrete signals based on the first and second coefficients and the gross electrical signal, the first and second coefficients indicating quantities of received light to attribute to each of the one or more optical sources.

7. The optical transmission device of claim 5, wherein:
each of the first and second optical monitors comprises a protrusion on the optical monitors that is configured to interrupt a third portion of the reflected portion of the first channel of light; and
the protrusions are configured to increase the first coefficient in relation to the second coefficient.

8. The optical transmission device of claim 5, wherein the collimator lenses are laterally symmetric and rotationally asymmetric.

9. A method of monitoring an optical system including a first optical source, a second optical source, a first optical monitor, a second optical monitor, a first collimator lens, and a second collimator lens, the method comprising:
energizing the first optical source such that the first optical source transmits a channel of light of a power level that is not known toward the first collimator lens, the channel of light being collimated by the first collimator lens and reflected as a Fresnel reflection from the collimator lens;
while the first optical source is transmitting the channel of light, receiving at the first and the second optical monitors a set of gross calibration electrical signals;
from the set of gross calibration electrical signals, calculating a first subset of coefficients of a set of coefficients which is configured to indicate quantities of received light to attribute to each of the first and second optical sources;
receiving a gross electrical signal representative of the received light that includes a plurality of reflected channels of light directly from the first and second collimator lenses; and based on the set of coefficients and the gross electrical signal, determining a discrete signal representative of a first channel of light transmitted by the first optical source, wherein a first gross calibration electrical signal and a second gross calibration electrical signal of the set of gross calibration electrical signals, and a first coefficient and a second coefficient of the first subset of coefficients are defined according to equations:

$a_1 RL_1 = CS_{RL11}$;

$a_2 RL_1 = CS_{RL12}$; and $a_1 + a_2 = 1$; in which:

$CS_{RL11}$ represents the first gross calibration electrical signal;

$CS_{RL12}$ represents the second gross calibration electrical signal;

$RL_1$ represents the first reflected channel of light; and $a_1$ and $a_2$ represent the first coefficient and the second coefficient, respectively.

10. The method of claim 9, further comprising interrupting a portion of the plurality of reflected channels of light reflected directly from the first and second collimator lenses.

11. The method of claim 9, further comprising:
receiving a first portion of a first reflected channel of light directly from the first collimator lens;
receiving a second portion of a second reflected channel of light directly from the second collimator lens; and
generating the gross electrical signal representative of the first portion of the first reflected channel of light and the second portion of the second reflected channel of light.

12. The method of claim 11, wherein the determining the discrete signal includes:
determining a quantity of the gross electrical signal to attribute to the first portion of the first reflected channel of light; and
determining another quantity of the gross electrical signal to attribute to the second portion of the second reflected channel of light.

13. The method of claim 9, wherein:
a sum of the set of gross calibration electrical signals represents a total received light at the first and second optical monitors; and
the calculating the first subset of coefficients includes dividing each of the set of gross calibration electrical signals by the sum of the set of the gross calibration electrical signals.

14. The method of claim 9, wherein:
the calculating the first subset of coefficients includes calculating the first coefficient as a ratio of the first gross calibration electrical signal to a total received light; and
the total received light is equal to the sum of the first gross calibration electrical signal and the second gross calibration electrical signal.

15. The optical transmission device of claim 1, wherein:
the calculating the first coefficient and the second coefficient includes calculating the first coefficient as a ratio of the first gross calibration electrical signal to a total received light; and
the total received light is equal to the sum of the first gross calibration electrical signal and the second gross calibration electrical signal.

* * * * *